US012442840B2

(12) United States Patent
Taoka et al.

(10) Patent No.: US 12,442,840 B2
(45) Date of Patent: Oct. 14, 2025

(54) CURRENT SENSOR AND ELECTRIC DEVICE

(71) Applicant: Alps Alpine Co., Ltd., Tokyo (JP)

(72) Inventors: Takahiro Taoka, Miyagi-ken (JP); Manabu Tamura, Miyagi-ken (JP); Akira Fukui, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 170 days.

(21) Appl. No.: 18/348,629

(22) Filed: Jul. 7, 2023

(65) Prior Publication Data

US 2023/0349956 A1  Nov. 2, 2023

Related U.S. Application Data

(63) Continuation of application No. PCT/JP2021/045463, filed on Dec. 10, 2021.

(30) Foreign Application Priority Data

Jan. 14, 2021 (JP) ................... 2021-004026

(51) Int. Cl.
G01R 15/20 (2006.01)
(52) U.S. Cl.
CPC .................. G01R 15/207 (2013.01)
(58) Field of Classification Search
CPC .................................. G01R 15/207
See application file for complete search history.

(56) References Cited

U.S. PATENT DOCUMENTS

| | | | | |
|---|---|---|---|---|
| 6,841,989 B2 * | 1/2005 | Goto | ...................... | G01R 33/07 324/251 |
| 8,330,453 B2 * | 12/2012 | Hotz | ................... | G01R 15/207 324/207.2 |
| 9,880,206 B2 * | 1/2018 | Akimoto | .............. | G01R 15/207 |
| 10,274,524 B2 * | 4/2019 | Kawanami | .......... | G01R 15/202 |
| 10,281,497 B2 * | 5/2019 | Shimizu | ................. | G01R 33/09 |
| 10,416,200 B2 | 9/2019 | Futakuchi | | |
| 11,047,884 B2 | 6/2021 | Shimizu | | |

(Continued)

FOREIGN PATENT DOCUMENTS

| | | |
|---|---|---|
| JP | 2016-121960 | 7/2016 |
| JP | 2017-133942 A | 8/2017 |

(Continued)

OTHER PUBLICATIONS

International Search Repot and Written Opinion from corresponding international application No. PCT/JP2021/045463, Mar. 1, 2022.

*Primary Examiner* — Dominic E Hawkins
(74) *Attorney, Agent, or Firm* — Crowell & Moring LLP

(57) ABSTRACT

A current sensor according to the present invention that measures a current to be measured flowing through a busbar includes a sensing section that is capable of detecting a magnetic field generated by flow of the current to be measured through the busbar. The current flowing in the busbar is measured based on a change in the magnetic field detected by the sensing section. The sensing section is inserted into a through-hole of the busbar that penetrates the busbar in a thickness direction of the busbar, and a direction of an axis of detection of the magnetic field performed by the sensing section extends in a direction of the insertion into the through-hole.

8 Claims, 8 Drawing Sheets

(56) References Cited

U.S. PATENT DOCUMENTS

| | | |
|---|---|---|
| 11,280,813 B2 | 3/2022 | Hebiguchi et al. |
| 2010/0045286 A1* | 2/2010 | Hotz .................... G01R 15/207 |
| | | 324/260 |
| 2011/0148407 A1* | 6/2011 | Kawaguchi .......... G01R 15/207 |
| | | 324/244 |
| 2018/0149678 A1 | 5/2018 | Wolf et al. |
| 2018/0321281 A1* | 11/2018 | Fukuhara ............. G01R 15/207 |

FOREIGN PATENT DOCUMENTS

| | | |
|---|---|---|
| JP | 2018-072299 | 5/2018 |
| WO | WO 2017/010219 | 1/2017 |
| WO | WO 2018/163685 | 9/2018 |
| WO | WO 2018/185964 | 10/2018 |
| WO | WO 2017/061206 | 4/2019 |

\* cited by examiner

CURRENT SENSOR AND ELECTRIC DEVICE

CLAIM OF PRIORITY

This application is a Continuation of International Application No. PCT/JP2021/045463 filed on Dec. 10, 2021, which claims benefit of priority to Japanese Patent Application No. 2021-004026 filed on Jan. 14, 2021. The entire contents of each application noted above are hereby incorporated by reference.

BACKGROUND

1. Field of the Disclosure

The present disclosure relates to a current sensor that measures a current to be measured based on a magnetic field generated by a flow of the current to be measured in a busbar, and to a current detection device including the busbar and the current sensor.

2. Description of the Related Art

There is a demand for a current sensor that suppresses influence of an external magnetic field and detects a current flowing through a conductor with high accuracy in current sensors including a sensing section capable of detecting a magnetic field generated by a current flowing through a conductor. For example, in the current sensor described in Japanese Unexamined Patent Application Publication No. 2017-133942, two conductor sections are disposed so as to be plane-symmetrical in a conductor, and two magnetic sensors are disposed in an aperture formed between the conductor sections so that distances between the magnetic sensors and the corresponding conductor sections are equal to each other. In this current sensor, a value of current flowing through the two conductor sections may be calculated from a difference between results of detections performed by the individual magnetic sensors. Furthermore, a planar shape of the aperture is prescribed such that a magnetic flux density gradient in a width direction of the aperture is maximized, so that a difference between induced magnetic fields of the current flowing through the two conductor sections is increased, resulting in achievement of high measurement accuracy.

However, the current sensor described in Patent Document 1 requires high manufacturing precision in the symmetry of shapes of the two conductor sections, a shape of the aperture, and the arrangement of the two magnetic sensors, and when the shapes or positions of the conductor sections, the aperture, and the magnetic sensors differ from designed values due to manufacturing errors, it may be difficult to sufficiently suppress the influence of the external magnetic fields, and accordingly, it may be difficult to detect a current with high accuracy. Furthermore, in this current sensor, the two magnetic sensors are required to be mounted on the conductor (a busbar) at specified positions, and therefore, in a configuration in which the conductor penetrates a substrate, for example, high-accuracy implement of the magnetic sensors is added to a process of assembling the conductor and other components, and therefore, a manufacturing process is complicated.

SUMMARY

The present invention provides a current sensor with a configuration that can effectively suppress an effect of an external magnetic field and can be manufactured without direct mounting on a busbar, and an electric device including such a current sensor. For example, the object is to provide a current sensor that does not manufactured by a complicated process even though a busbar penetrates a substrate and an electric device including the current sensor.

A current sensor that measures a current to be measured flowing through a busbar includes a sensing section that is capable of detecting a magnetic field generated by flow of the current to be measured through the busbar. The current flowing in the busbar is measured based on a change in the magnetic field detected by the sensing section. The sensing section is inserted into a through-hole of the busbar that penetrates the busbar in a thickness direction of the busbar, and a direction of an axis of detection of the magnetic field performed by the sensing section extends in a direction of the insertion into the through-hole.

Accordingly, arrangement for reducing adverse effects of an external magnetic field without complicating a manufacturing process may be realized since direct mounting on the busbar is not performed.

BRIEF DESCRIPTION OF THE DRAWINGS

FIG. 1 includes diagrams illustrating configurations of a current sensor and an electric device according to an embodiment of the present invention, where

FIG. 2 includes diagrams illustrating a configuration of the current sensor according to the embodiment of the present invention, where

FIG. 7 includes front views of the relationship between a busbar and a detection section according to a second modification, where FIG. 8 includes side views of the relationship between a busbar and a current sensor according to a third modification, where

DESCRIPTION OF THE EXEMPLARY EMBODIMENTS

Hereinafter, a current sensor and an electric device according to an embodiment of the present invention will be described in detail with reference to the accompanying drawings. In the individual drawings, an X-Y-Z coordinate is illustrated as a reference coordinate. In the following description, an X1-X2 direction is referred to as width directions or lateral directions of individual components, a Y1-Y2 direction as front-back directions, and a Z1-Z2 direction as vertical directions. The X1-X2 and Y1-Y2 directions are perpendicular to each other, and an X-Y plane including the X1-X2 and Y1-Y2 directions is perpendicular to the Z1-Z2 direction. A view from a top (a Z1 side) to a bottom (a Z2 side) in the Z1-Z2 direction is referred to as a plan view where appropriate.

Figure 1A:
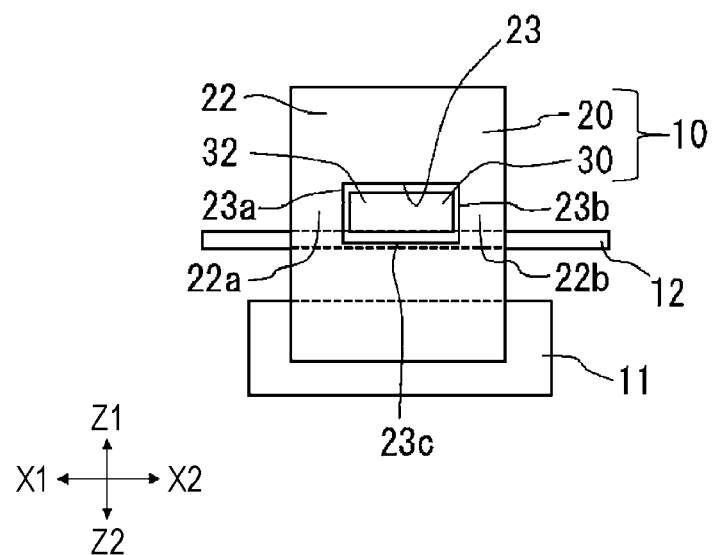
FIG. 1A is a front view and FIG. 1B is a side view.
Figure 1B:
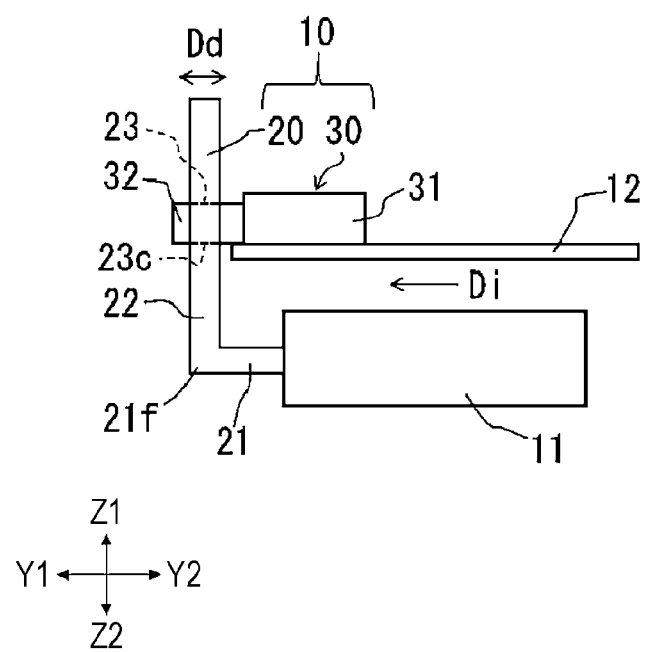
Figure 2A:
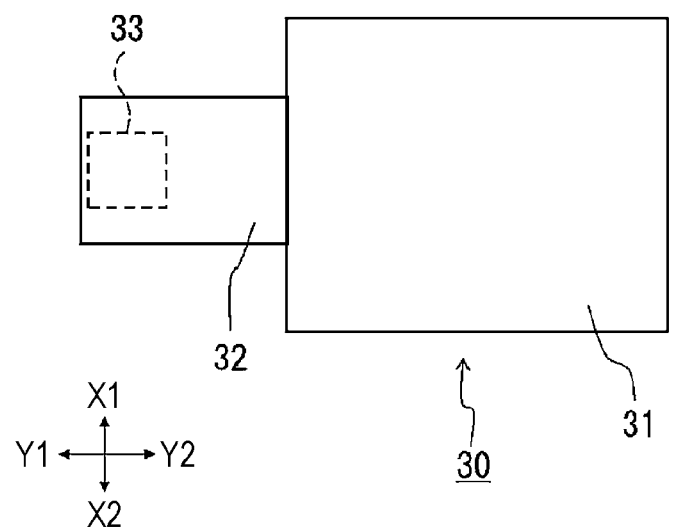
FIG. 2A is a plan view and FIG. 2B is a side view.
Figure 2B:
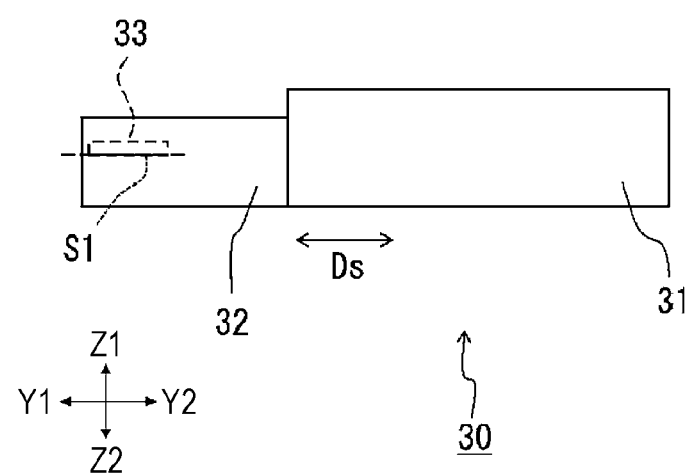
Figure 3A:
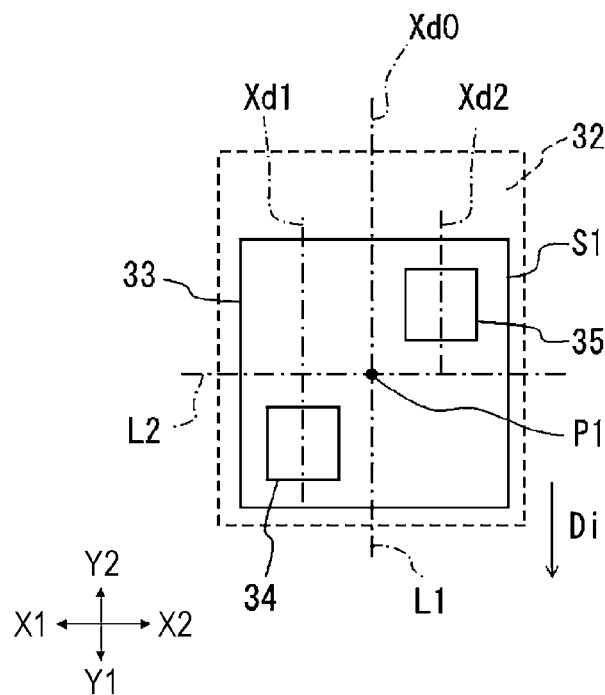
FIG. 3A is a plan view of a configuration of a sensing section according to the embodiment of the present invention.
Figure 3B:
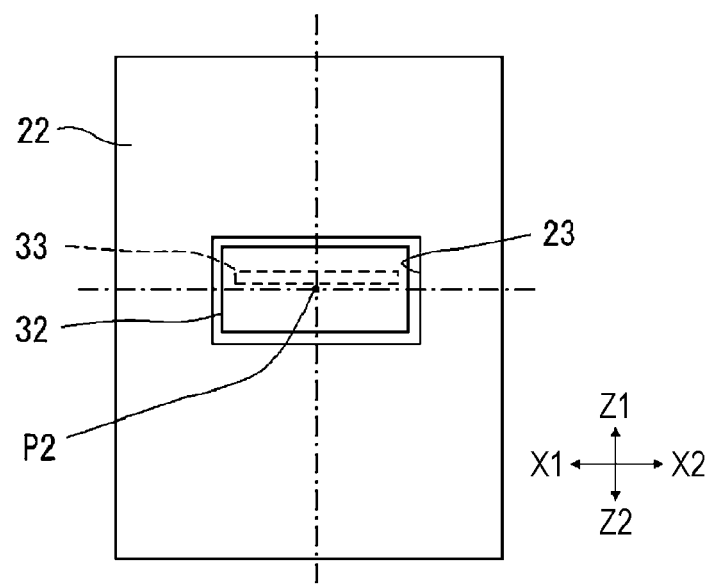
FIG. 3B is a front view illustrating a state in which the detection section is inserted into a through-hole.

FIG. 1 includes diagrams illustrating configurations of a current sensor 30 and an electric device 10 according to this embodiment, where FIG. 1A is a front view and FIG. 1B is a side view. FIG. 2 includes diagrams illustrating a configuration of the current sensor 30, where FIG. 2A is a plan view and FIG. 2B is a side view. FIG. 3A is a plan view of a configuration of a sensing section 33 included in the current sensor 30, and FIG. 3B is a front view illustrating a state in which a detection section 32 is inserted into a through-hole 23.

As shown in FIGS. 1A and 1B, the electric device 10 has a busbar 20 through which a current to be measured flows and the current sensor 30 that measures the current to be measured. As shown in FIGS. 2A and 2B, the current sensor 30 includes a body section 31, the detection section 32, and the sensing section 33. As shown in FIG. 3A, the sensing section 33 includes a first sensor 34 and a second sensor 35 capable of detecting a magnetic field. The sensing section 33 detects a magnetic field based on results of the detection performed by the first and second sensors 34 and 35. For example, magnetoresistive effect devices, such as GMR devices (giant magnetoresistive effect devices), are used as the first and second sensors 34 and 35.

As shown in FIG. 1B, the busbar 20 has a shape of a long plate of conductive material bent into an L-shape when viewed from the side. The busbar 20 includes a base 21 extending in the front-back direction (the Y1-Y2 direction). A bent portion 21f is formed at an end of the base 21 on an opposite side of a semiconductor 11, and a standing section 22 extends from the bent portion 21f in the vertical direction (the Z1-Z2 direction) orthogonal to the front-back direction. The standing section 22 has a through-hole 23 that penetrates the standing section 22 in a thickness direction Dd of the standing section 22. The through-hole 23 has a rectangular shape extending in the vertical direction (the Z1-Z2 direction) and the lateral direction (the X1-X2 direction) when viewed in the front-back direction.

As shown in FIG. 1B, the current sensor 30 is disposed at a front end (a Y1 side) of a control board 12. As shown in FIGS. 2A and 2B, the current sensor 30 includes a body section 31 mounted on the control board 12, the detection section 32 extending forward from the body section 31, and the sensing section 33 disposed in the detection section 32. As shown in FIG. 1B, the detection section 32 extends forward from a front end of the control board 12, and the sensing section 33 also extends forward from the front end of the control board 12.

The detection section 32 has a rectangular shape extending in the vertical direction (the Z1-Z2 direction) and the lateral direction (the X1-X2 direction) in a direction orthogonal to a direction of the extension from the body section 31, similarly to the through-hole 23, and four sides of this rectangle are long enough to be inserted into the through-hole 23 (refer to FIG. 1A). On the other hand, the body section 31 has lengths (a length, a size, etc.) that are larger than a size of an opening shape of the through-hole 23 in both the vertical direction (the Z1-Z2 direction) and the lateral direction (the X1-X2 direction). Therefore, when the entire detection section 32 is inserted into the through-hole 23 in the front-back direction (the Y1-Y2 direction), the insertion is restricted because the body section 31 contacts a side of the standing section 22 of the busbar 20. An actual insertion position of the detection section 32 is determined in accordance with a relative position between the busbar 20 and the sensing section 33 of the detection section 32 as described below.

Figure 4:
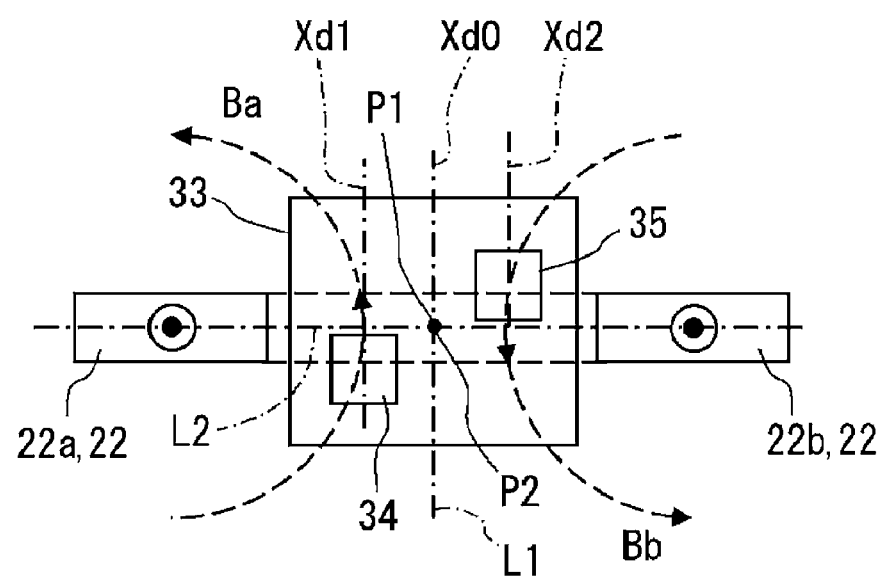
FIG. 4 is a plan view of the relationship between a sensing section and a busbar according to the embodiment of the present invention.
Figure 4:
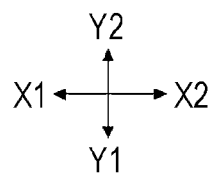

The sensing section 33 is disposed on a virtual setting plane S1 (FIG. 2B and FIG. 3A) that is orthogonal to the vertical direction (the Z1-Z2 direction). As shown in FIG. 3A, in an in-plane direction Ds of the setting plane S1, a first virtual line L1 extending in the front-back direction (an insertion direction of the detection section 32), a second virtual line L2 orthogonal to the first virtual line L1, and a reference point P1 that is an intersection of the first virtual line L1 and the second virtual line L2 are set. Furthermore, as shown in FIG. 3A and FIG. 4, a point that is a center of the through-hole 23 when viewed in the Y1-Y2 direction and a center of the through-hole 23 when viewed in the Z1-Z2 direction is set as a center P2 of the shape of the through-hole 23. The detection section 32 is positioned in the through-hole 23 so that the reference point P1 and the center P2 overlap with each other when viewed in the Z1-Z2 direction, as shown in FIG. 4.

In the sensing section 33, the first sensor 34 and the second sensor 35 are arranged to be point symmetrical with respect to the reference point P1. Furthermore, the first and second sensors 34 and 35 at this time are not disposed on the first and second virtual lines L1 and L2. Note that a state in which the first and second sensors 34 and 35 are disposed on the first and second virtual lines L1 and L2 means a state in which centers of the first and second sensors 34 and 35 are located on the first and second virtual lines L1 and L2. The centers of the first and second sensors 34 and 35 indicate a reference position for magnetic detection by the GMR devices or other devices capable of detecting a magnetic change included in the first and second sensors 34 and 35, and preferably correspond to a center of a plane viewed in the vertical direction (the Z1-Z2 direction) to facilitate their arrangement. The first sensor 34 and the second sensor 35 are arranged so that a first detection axis Xd1 which is an axis of detection of a magnetic field by the first sensor 34 and a second detection axis Xd2 which is an axis of detection of a magnetic field by the second sensor 35 individually extend in the front-back direction (the Y1-Y2 direction). As a result, a detection axis Xd0, which is an axis of detection of a magnetic field by the sensing section 33 including the first sensor 34 and the second sensor 35, also extends in the front-back direction. Here, the front-back direction corresponds to an insertion direction Di of the current sensor 30 into the through-hole 23 of the busbar 20, and the setting plane S1 includes the insertion direction Di.

Figure 5A:
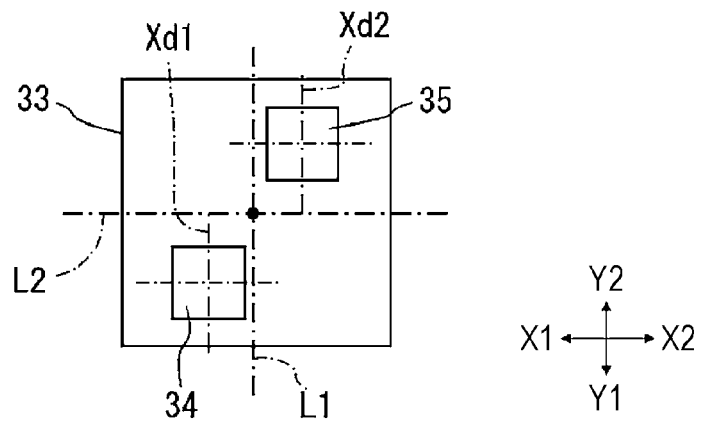
FIGS. 5A to 5C are plan views of examples of arrangement of sensors in the sensing section.
Figure 5B:
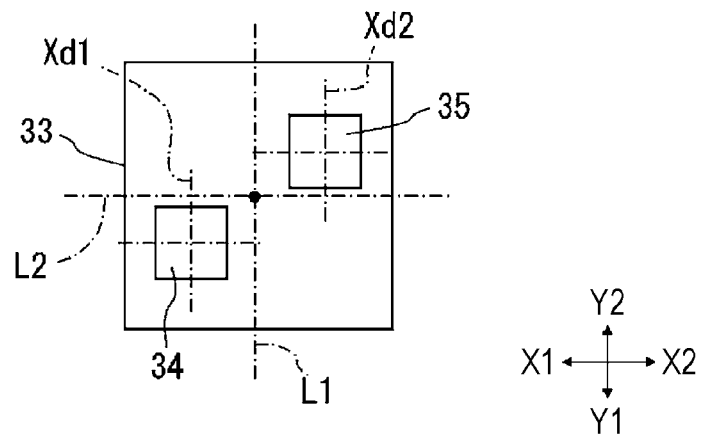
Figure 5C:
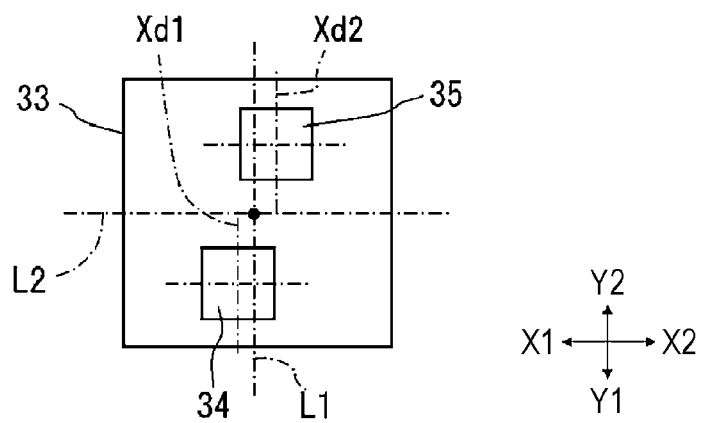

In the sensing section 33, the first and second sensors 34 and 35 are arranged such that their respective detection axes Xd1 and Xd2 are parallel to each other and do not overlap with each other. Thus, for example, when compared to the arrangement shown in FIG. 3A, an arrangement in which a distance between the first and second sensors 34 and 35 is closer in the direction along the second virtual line L2 as shown in FIG. 5A, an arrangement in which a distance between the first and second sensors 34 and 35 is closer in the direction along the first virtual line L1 as shown in FIG. 5B, or an arrangement in which a portion of the first sensor 34 and a portion of the second sensor 35 overlap with the first virtual line L1 and the centers of the first and second sensors 34 and 35 are shifted from each other in a plan view as shown in FIG. 5C may be employed.

Furthermore, the number of sensors included in the sensing section 33 may be three or more as long as respective sensing axes are parallel to each other and do not overlap with each other. In this case, it is preferable that the centers of the sensors in plan view (viewed from a direction orthogonal to the setting plane S1) are arranged so as to be shifted from each other.

The current sensor 30 is inserted into the through-hole 23 of the busbar 20 in the front-back direction (the insertion direction Di) so that the sensing section 33 is located in a predetermined position. The inserted sensing section 33 extends from a base 23c of the rectangular through-hole 23 in the front view, is positioned in a region between two ends of two sides 23a and 23b that are parallel to each other, and extends outward from the base 23c in the front-back direction. After the insertion, the control board 12 is fixed to a member disposed on a housing not illustrated. As shown in FIG. 1A and FIG. 4, when opposite sides of the through-hole 23 in a width direction of the standing section 22 of the busbar 20 are determined as first and second conductor sections 22a and 22b, the current sensor 30 is inserted and fixed such that the first and second conductor sections 22a and 22b are located on an extension of the second virtual line L2. The sensing section 33 is positioned such that the reference point P1 is located in the through-hole 23.

When a current is supplied to the busbar 20, the current flows in the same direction in the vertical direction in the first and second conductor sections 22a and 22b. For example, as partially shown in FIG. 4, when a current flows from bottom to top, i.e., from the base 21 to the standing section 22, a first induced magnetic field Ba is generated by the current flowing through the first conductor section 22a and a second induced magnetic field Bb is generated by the current flowing through the second conductor section 22b. In the sensing section 33 located between the first and second conductor sections 22a and 22b, the first and second induced magnetic fields Ba and Bb are opposite to each other in plan view.

In the sensing section 33 inserted into the through-hole 23, the first induced magnetic field Ba is detected by the first sensor 34 and the second induced magnetic field Bb is detected by the second sensor 35. A current value of the current to be measured flowing through the busbar 20 is measured based on a difference between detection outputs of the first and second sensors 34 and 35. Even when the position of the sensing section 33 is slightly shifted in the X1-X2 or Y1-Y2 direction, an error caused by the shift is canceled by obtaining the difference between the detection outputs of the first and second sensors 34 and 35, and therefore, the measurement accuracy of the current to be measured is improved.

Modifications will be described below.

First Modification

Figure 6A:
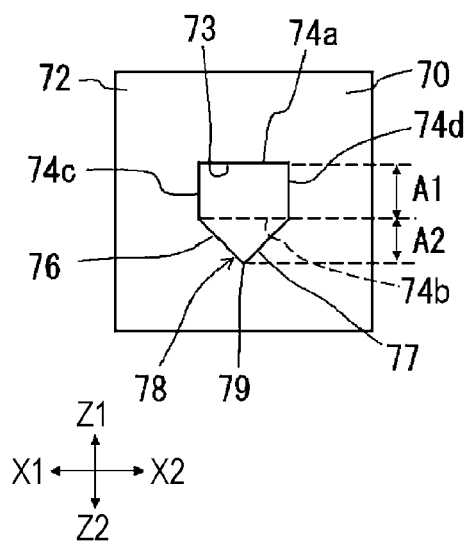
FIG. 6A is a front view of a configuration of a standing section of a busbar according to a first modification.
Figure 6B:
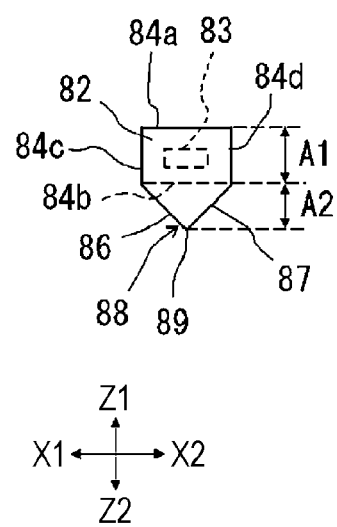
FIG. 6B is a front view of a configuration of a detection section.
Figure 6C:
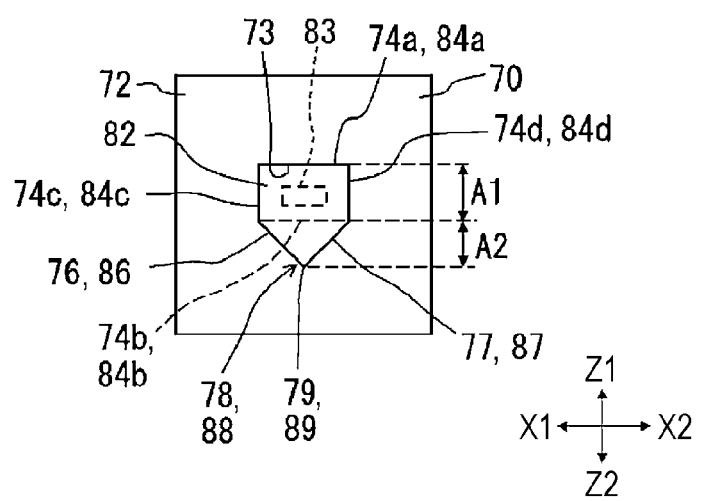
FIG. 6C is a front view of a state in which the detection section is inserted into a through-hole of the busbar.

FIG. 6A is a front view of a configuration of a standing section 72 of a busbar 70 according to a first modification, FIG. 6B is a front view of a configuration of a detection section 82 according to the first modification, and FIG. 6C is a front view of a state in which a detection section 82 is inserted into a through-hole 73 of the busbar 70 according to the first modification.

In the first modification, as with the current sensor 30 of the above embodiment, the detection section 82 extends from a body section 31 fixed to a control board 12. Furthermore, as with the busbar 20 of the above embodiment, a base 21 is disposed in a semiconductor 11, and the through-hole 73 is formed to penetrate the standing section 72, which is provided by bending an edge of the base 21, in a thickness direction. Note that, in FIGS. 6A and 6B, the control board 12, the body section 31, the base 21, and the semiconductor 11 are omitted.

As shown in FIG. 6A, when viewed along a thickness direction of the standing section 72 (a direction perpendicular to a sheet surface of the figure), with the direction of the base 21 in the standing section 72 as a lower direction, the through-hole 73 is formed as a pentagonal shape with a triangle on a bottom (a Z2 side) and a rectangle on a top (a Z1 side) when viewed from a front. The aforementioned triangular portion, that is, a bottom 78, is shaped as an isosceles triangle having a vertex angle 79 on a lower side and a base (a side corresponding to a virtual lower surface 74b) on an upper side, and two bottom surfaces 76 and 77 corresponding to two oblique sides serve as a positioning shaped section. The rectangular portion has one side serving as the same base as the isosceles triangle in the bottom 78. In the rectangular section above, it is assumed that a virtual plane overlapping with the base of the isosceles triangle is determined as a lower surface 74b, a surface parallel to the lower surface 74b is determined as an upper surface 74a (a portion opposite to the top (the vertex angle 79) connecting the two oblique sides (the bottom surfaces 76 and 77) of the positioning shapes section), and two surfaces connecting the lower surface 74b and the upper surface 74a are determined as side surfaces 74c and 74d. It is assumed that a distance between the upper surface 74a and the lower surface 74b (a length of the side surfaces 74c and 74d) is A1.

As shown in FIG. 6B, the detection section 82 has a pentagonal shape when viewed from the front, has an external shape that extends in a pentagonal prism shape in a direction of insertion into the through-hole 73 (perpendicular to the surface of the paper in the figure), and incorporates a sensing section 83 which has a configuration similar to that of the sensing section 33 of the above embodiment. The sensing section 83 is disposed such that a reference point P1, a first sensor 34, and a second sensor 35 are in predetermined positions with respect to a busbar 70, as described in the above embodiment.

The detection section 82 has a bottom shape with two bottom surfaces 86 and 87 corresponding to two oblique sides of an isosceles triangle whose distance from each other increases upward from a vertex angle 89, as a reference shaped section at a bottom 88, viewed from the front. An angle formed by the two bottom surfaces 86 and 87 is the same as an angle formed by the two bottom surfaces 76 and 77 of the through-hole 73 of the busbar 70.

The detection section 82 has a pentagonal shape in a plane orthogonal to the insertion direction, which is formed by overlapping a base of the isosceles triangle in the above bottom shape and a base of the rectangle with each other. The above rectangle has a virtual lower surface 84b that overlaps with the base of the above isosceles triangle, an upper surface 84a that is parallel to the lower surface 84b (a portion opposite the top (the vertex angle 89) that connects the two oblique sides (the bottom surfaces 86 and 87) of the reference shaped section to each other), and two side surfaces 84c and 84d that connect the lower surface 84b and the upper surface 84a to each other. A distance between the upper and lower surfaces 84a and 84b (a length of the sides 84c and 84d) is A1 which is the same as the distance between the upper and lower surfaces 74a and 74b in the through-hole 73. Furthermore, the distance in the vertical direction from the base of the isosceles triangle (the lower surface 84b) to the vertex angle 89 is the same A2 as the distance from the lower surface 74b to the vertex angle 79 in the through-hole 73. Therefore, in the front view, the detection section 82 has the same shape as the through-hole 73. Therefore, as shown in FIG. 6C, when the detection section 82 is inserted into the through-hole 73, the sensing section 83 is positioned in a rectangular region when the upper surface 74a, the lower surface 74b, and the side surfaces 74c and 74d are viewed from the front, and contacts with inner surfaces of the pentagonal shape of the through-hole 73 so that positioning in the vertical direction (the Z1-Z2 direction) and the lateral direction (the X1-X2 direction) can be securely and easily performed.

Note that, in the busbar 70 according to the first modification, an area of a cross-section obtained by cutting, by the X-Y plane, portions on the opposite sides in the X1-X2 direction of the through-hole 73 (corresponding to the first conductor section 22a and the second conductor section 22b in the first embodiment above) in the rectangular region in the opening shape of the through-hole 73 is constant at any portion in the region. On the other hand, an area of a cross-section obtained by cutting in the region of the bottom 78 (the triangular region) varies depending on a cutting position. Therefore, a current value of the current to be measured flowing on the opposite sides of the rectangular region in the X1-X2 direction is stable when compared with a current to be measured flowing on the opposite sides of the bottom 78 in the X1-X2 direction. Therefore, the current value may be more accurately measured by disposing the sensing section 83 in the rectangular region when the upper surface 74a, the lower surface 74b, and the side surfaces 74c and 74d are viewed from the front. The same is true for a second modification described below.

Second Modification

Figure 7A:
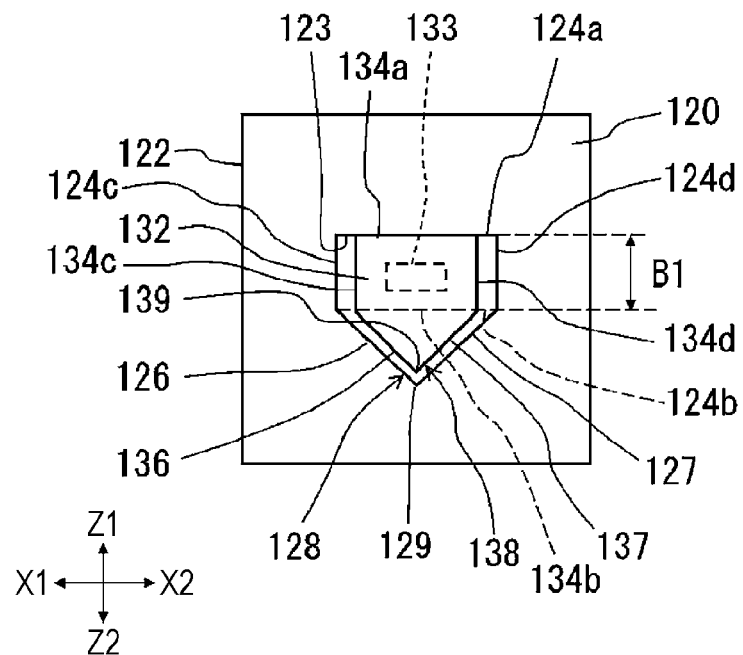
FIG. 7A illustrates a state in which the detection section is inserted into a through-hole.
Figure 7B:
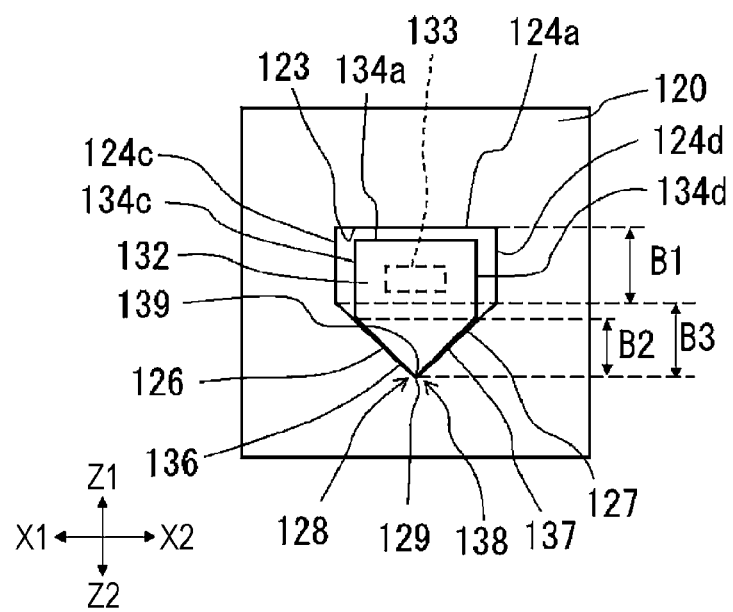
FIG. 7B illustrates a state in which a bottom of the detection section is brought into contact with a bottom of the through-hole from the state of FIG. 7A.

Although the through-hole 73 and the detection section 82 have the same pentagonal shape and the same size in the front view according to the first modification, a size of a detection section 132 may be smaller than a through-hole 123 in the vertical direction as shown in FIGS. 7A and 7B. Here, FIG. 7A is a front view illustrating a state in which the detection section 132 is inserted into the through-hole 123 of a standing section 122 of a busbar 120, and FIG. 7B is a front view illustrating a state in which a bottom 138 of the detection section 132 is brought into contact with an inner surface of the bottom 128 of the through-hole 123 after the insertion illustrated in FIG. 7A.

As shown in FIGS. 7A and 7B, the through-hole 123 and the detection section 132 have a pentagonal shape viewed from the front, similarly to the through-hole 73 and the detection section 82 in the first modification. Similarly, to the through-hole 73 of the first modification, the through-hole 123 has a pentagonal shape formed such that a bottom 128 serving as a positioning shaped section has two bottom surfaces 126 and 127 corresponding to two oblique sides of an isosceles triangle whose distance from each other increases toward a vertex angle 129 and a base of the isosceles triangle of this bottom shape overlaps with a base of a rectangle. The above rectangle has a virtual lower surface 124b that overlaps with the base of the isosceles triangle, an upper surface 124a that is parallel to the lower surface 124b, and two side surfaces 124c and 124d that connect the lower surface 124b and the upper surface 124a to each other. It is assumed that a distance between the upper surface 124a and the lower surface 124b (a length of the side surfaces 124c and 124d) is B1.

As with the detection section 82 of the first modification, the detection section 132 has an external shape extending in a pentagonal prism shape in a direction of insertion into the through-hole 123 (perpendicular to the paper surface in the figure), and incorporates a sensing section 133 having the same configuration as the sensing section 33 of the above embodiment. The sensing section 133 is disposed such that, as with the foregoing embodiment, a reference point P1, a first sensor 34, and a second sensor 35 are located in predetermined positions with respect to the busbar 120. The detection section 132 has a bottom shape with two bottom surfaces 136 and 137 corresponding to two oblique sides of an isosceles triangle whose distance from each other increases upward from a vertex angle 139, as a reference shaped section at a bottom 138, viewed from the front. An angle formed by the two bottom surfaces 136 and 137 is the same as the angle formed by the two bottom surfaces 126 and 127 of the through-hole 123 of the busbar 120, and a pentagonal shape is formed by overlapping a base of the isosceles triangle of the bottom shape and a base of the rectangle. The above rectangle has a virtual lower surface 134b that overlaps with the base of the isosceles triangle, an upper surface 134a that is parallel to the lower surface 134b, and two side surfaces 134c and 134d that connect the lower surface 134b and the upper surface 134a to each other. A distance between the upper and lower surfaces 134a and 134b (a length of the sides 134c and 134d) is B1 which is the same as the distance between the upper and lower surfaces 124a and 124b in the through-hole 123.

Furthermore, a distance B2 in the vertical direction from the base of the isosceles triangle (the lower surface 134b) to the vertex angle 139 is smaller than a distance B3 from the lower surface 124b to the vertex angle 129 in the through-hole 73 (refer to FIG. 7B). Therefore, in the vertical direction, the detection section 132 is smaller than the through-hole 123 in size. Furthermore, a maximum width of the detection section 132 is set smaller than a maximum width of the through-hole 123. This size setting allows for easy and quick insertion of the detection section 132 into the through-hole 123 and reduces friction between the detection section 132 and the through-hole 123 at a time of insertion.

The size relationship described above between the detection section 132 and the through-hole 123 allows the insertion of the detection section 132 into the through-hole 123 with a gap between the bottoms 128 and 138 of the through-hole 123 and the detection section 132, as shown in FIG. 7A, for example. In this state, when the detection section 132 is lowered, the detection section 132 is guided securely and easily to a position where the vertex angle 139 of the detection section 132 is in contact with the vertex angle 129 of the through-hole 123, because the angle formed by the two bottom surfaces 136 and 137 of the detection section 132 is the same as the angle formed by the two bottom surfaces 126 and 127 of the through-hole 123, so that the detection section 132 is positioned.

Note that, crush ribs, which extend in an insertion direction Di and are crushed and fitted when the detection section 132 is inserted into the through-hole 123, may be provided on an outer wall of the detection section 132 corresponding to a portion of the gap between the detection section 132 and the through-hole 123 in FIG. 7B.

Third Modification

Figure 8A:
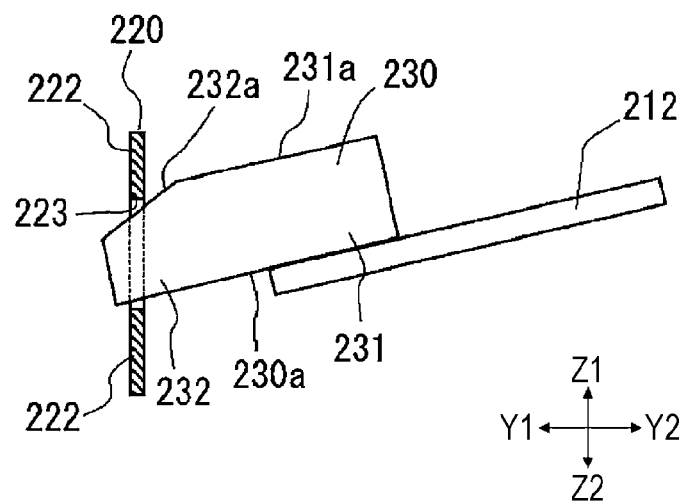
FIG. 8A illustrates a state in which a detection section is inserted into a through-hole.
Figure 8B:
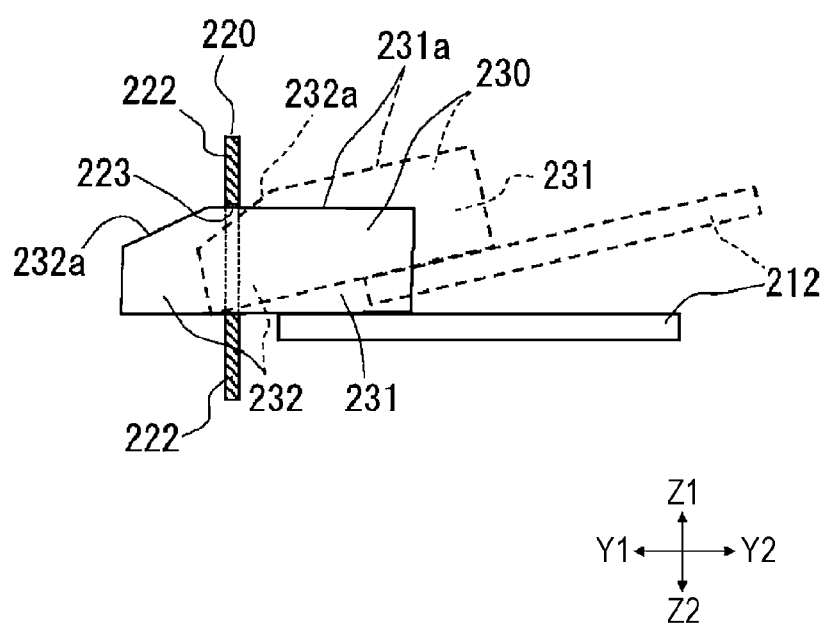
FIG. 8B illustrates a state after a posture is changed from the state of FIG. 8A so that the current sensor extends in a busbar thickness direction.

FIG. 8A is a side view illustrating a state in which a detection section 232 of a current sensor 230 is started to be inserted into a through-hole 223 of a standing section 222 of a busbar, and FIG. 8B is a side view illustrating a state in which the detection section 232 is further inserted in the state in FIG. 8A and the insertion into the through-hole 223 is completed. In FIG. 8B, the state of FIG. 8A is shown as dashed lines.

As shown in FIG. 8A, the current sensor 230 has a body section 231 fixed to a control board 212, and the detection section 232 disposed on a tip end (a front side) (a Y1 side) of the body section 231. The body section 231 and the detection section 232 share a bottom surface 230a. Here, a sensing section (not shown) that has the same configuration as the sensing section 33 according to the foregoing embodiment is incorporated in the detection section 232. The sensing section is disposed such that a reference point P1, a first sensor 34, and a second sensor 35 are in predetermined positions with respect to the busbar 220, as in the above embodiment.

As shown in FIGS. 8A and 8B, an upper surface of the detection section 232 has a tapered section 232a that decreases a thickness of the detection section 232 toward a tip end thereof.

Note that the tapered section 232a is disposed at the tip end of the detection section 232, and a range of the tapered section 232a may be the entire detection section 232 or a portion of the detection section 232.

As shown in FIG. 8B, the through-hole 223 penetrates the standing section 222 of the busbar in a thickness direction, and its shape viewed from the front corresponds to an external shape of the body section 231.

Since the tapered portion 232a is formed in the detection section 232, the detection section 232 has a tapered shape, and accordingly, insertion into the through-hole 223 is facilitated. As shown in FIG. 8A, for example, insertion of the current sensor 230 at an angle that facilitates insertion is achieved, and during the insertion, the current sensor 230 is guided by the tapered portion 232a and a subsequent upper surface 231a of the body section 231 in a front-back direction. Accordingly, the current sensor 230 is positioned in a posture orthogonal to the standing section 222 of the busbar.

Note that, in FIGS. 8A and 8B, the detection section 232 is inserted into the through-hole 223 with the current sensor 230 attached to the control board 212, but the current sensor 230 and the control board 212 may be separated.

Other Modifications

In the second modification, the tapered section 232a is formed on the upper surface of the detection section 232, but in addition to or instead of this, a tapered section may be formed on the bottom surface or side surfaces of the detection section.

As in the foregoing embodiment, in the configuration in which the through-hole 23 has a shape and a size that allow insertion of the detection section 32 but does not allow insertion of the body section 31, a tapered portion may be formed on one or more surfaces of the tip end of the detection section 32 so that the thickness or the width of the detection section 32 is reduced toward the tip end. By this, the insertion of the detection section 32 into the through-hole 23 is facilitated, easy and secure insertion is available, and arrangement in a predetermined position is realized.

Although the present invention is described with reference to the foregoing embodiments, the present invention is not limited to the foregoing embodiments and may be altered or modified within the object of improvement or the scope of the invention.

What is claimed is:

1. A current sensor disposed separately from a busbar having a through-hole that penetrates the busbar in a thickness direction and that measures a current to be measured flowing through the busbar in a state in which the current sensor is inserted into the through-hole, the current sensor comprising:
   a body section;
   a detection section that extends from the body section and that is inserted into the through-hole;
   a sensing section incorporated in the detection section and capable of detecting a magnetic field generated by flow of the current to be measured through the busbar,
   wherein:
      the current flowing in the busbar is measured based on a change in the magnetic field detected by the sensing section,
      a direction of an axis of detection of the magnetic field performed by the sensing section extends in a direction of the insertion into the through-hole, when the sensing section is inserted into the through-hole together with the detection section,
      the detection section has a reference shaped section that performs positioning of the detection section with respect to the through-hole,
      the sensing section has a plurality of sensors that detect magnetic fields, and detection axes of the respective sensors are parallel to each other and do not overlap with each other,
      the plurality of sensors is arranged in a setting plane including the insertion direction, and centers of the sensors are shifted from each other when viewed in a direction corresponding to an in-plane direction of the setting plane and orthogonal to the insertion direction,
      first and second sensors are provided as the plurality of sensors, and
      when a first virtual line extending in the insertion direction and a second virtual line orthogonal to the first virtual line are set in the in-plane direction of the setting plane,
         the first and second sensors are disposed in point-symmetrical positions with respect to a reference point, which is an intersection of the first and second virtual lines, except on the first and second virtual lines, and
         a current value of the current to be measured flowing in the busbar is calculated based on an output of the first sensor and an output of the second sensor.

2. The current sensor according to claim 1, comprising:
   a detection section that incorporates the sensing section and that is inserted into the through-hole together with the sensing section, wherein:
      the detection section has a shape corresponding to the through-hole in a cross-section orthogonal to the insertion direction, and
      the sensing section is disposed in a position having the predetermined positional relationship with the through-hole when the detection section is inserted into the through-hole.

3. The current sensor according to claim 2, wherein the detection section extends from a body section that has an external shape larger than the through-hole and is positioned by the body section contacting the busbar when being inserted into the through-hole.

4. An electric device comprising:
   a busbar having a through-hole penetrating in a thickness direction; and
   a current sensor that measures a current to be measured flowing through the busbar, wherein:

the current sensor has a detection section to be inserted into the through-hole, the detection section has a sensing section including first and second sensors capable of detecting magnetic fields generated by flow of the current to be measured through the busbar, the current sensor is configured to measure a current flowing in the busbar based on a change in the magnetic field detected by the sensing section, when a first virtual line extending in a direction of insertion of the detection section into the through-hole, a second virtual line orthogonal to the first virtual line, and a reference point that is an intersection of the first and second virtual lines are set in a setting plane including the insertion direction, the detection section is positioned in the through-hole such that a center of a shape of the through-hole in a plane orthogonal to the thickness direction and the reference point coincide with each other, the through-hole has an aperture shape with a positioning shaped section corresponding to two oblique sides of an isosceles triangle, and the detection section has a reference shaped section corresponding to the two oblique sides of an isosceles triangle and corresponding to the positioning shaped section of the through-hole when viewed in the thickness direction of the busbar, and the detection section is disposed in the through-hole such that a top connecting the two oblique sides of the reference shaped section contacts a top connecting the two oblique sides of the positioning shaped section in the through-hole.

5. The electric device according to claim 4, wherein the detection section is disposed in the through-hole such that a portion that faces the top connecting the two oblique sides of the reference shaped section contacts a portion that faces the top connecting the two oblique sides of the positioning shaped section.

6. The electric device according to claim 4, wherein
the through-hole has a pentagonal shape, in a plane orthogonal to the thickness direction, which is formed by overlapping a base of an isosceles triangle of a bottom shape of the through-hole and a base of a rectangle with each other, and
the detection section has a pentagonal shape, in a plane orthogonal to the insertion direction, which is formed by overlapping a base of an isosceles triangle of a bottom shape of the detection section and a base of a rectangle with each other.

7. The electric device according to claim 6, wherein the sensing section is located, when the detection section is located in the through-hole, in a region between opposite ends of two sides which are parallel to each other and which extend from the base of the rectangle in the through-hole.

8. The electric device according to claim 7, wherein the detection section has a tapered section which reduces a thickness of the detection section toward a tip end at a tip end portion in the direction of the insertion into the through-hole.

* * * * *